United States Patent
Moriuchi (10) Patent No.: US 11,961,338 B2
(45) Date of Patent: Apr. 16, 2024

(54) COMMUNICATION APPARATUS, VEHICLE, SYSTEM, AND DETERMINATION METHOD

(71) Applicant: TOYOTA JIDOSHA KABUSHIKI KAISHA, Toyota (JP)

(72) Inventor: Yosuke Moriuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 17/456,467

(22) Filed: Nov. 24, 2021

(65) Prior Publication Data

US 2022/0172522 A1  Jun. 2, 2022

(30) Foreign Application Priority Data

Nov. 30, 2020 (JP) ................. 2020-199193

(51) Int. Cl.
*G07C 5/00* (2006.01)
*G07C 5/08* (2006.01)
*H04W 4/44* (2018.01)

(52) U.S. Cl.
CPC .......... *G07C 5/008* (2013.01); *G07C 5/0808* (2013.01); *H04W 4/44* (2018.02)

(58) Field of Classification Search
CPC ....... G07C 5/008; G07C 5/0808; H04W 4/44; Y02T 90/16; H04L 67/142; H04L 67/12; H04L 43/0817; H04L 12/40; H04L 43/0811; H04L 2012/40215
See application file for complete search history.

(56) References Cited

U.S. PATENT DOCUMENTS

2010/0138103 A1  6/2010  Taki

FOREIGN PATENT DOCUMENTS

| JP | 5696669 B2 * | 1/2012 | ............ B60R 16/02 |
| JP | 2013-141947 A | 7/2013 | |
| JP | 2017-7410 A | 1/2017 | |
| JP | 2020-022019 A | 2/2020 | |

* cited by examiner

*Primary Examiner* — Michael V Kerrigan
(74) *Attorney, Agent, or Firm* — Oblon, McClelland, Maier & Neustadt, L.L.P.

(57) ABSTRACT

A communication apparatus is mounted on a vehicle together with a control apparatus configured to accept, from a device electrically connected to a connector on the vehicle, a communication request to request transmission of data and transmit a communication response including the data to the device. The communication apparatus includes a communication interface configured to sequentially transmit two or more communication requests to the control apparatus, and in a case in which a communication response corresponding to at least one of transmitted communication requests is received from the control apparatus, transmit data included in the received communication response to a server apparatus installed in a location different from the vehicle, and a controller configured to determine whether a device to be detected is electrically connected to the connector depending on whether the communication interface has received a communication response corresponding to each of the two or more communication requests.

20 Claims, 4 Drawing Sheets

COMMUNICATION APPARATUS, VEHICLE, SYSTEM, AND DETERMINATION METHOD

CROSS-REFERENCE TO RELATED APPLICATION

This application claims priority to Japanese Patent Application No. 2020-199193, filed on Nov. 30, 2020, the entire contents of which are incorporated herein by reference.

TECHNICAL FIELD

The present disclosure relates to a communication apparatus, a vehicle, a system, and a determination method.

BACKGROUND

Patent Literature (PTL) 1 discloses a method for acquiring data from a vehicle via an OBD connector. The term "OBD" is an abbreviation of on-board diagnostics.

CITATION LIST

Patent Literature

PTL 1: JP 2017-007410 A

SUMMARY

Communication that takes place via an OBD connector for fault diagnosis is called "diagnostic communication". In the diagnostic communication, data for fault diagnosis is transmitted from ECUs in response to requests from a diagnostic tool connected to the OBD connector, and the data is received by the diagnostic tool, thereby enabling fault diagnosis. The term "ECU" is an abbreviation of electronic control unit.

In general, data is transmitted and received between the ECUs by CAN communication. The term "CAN" is an abbreviation of Controller Area Network. External devices cannot access the CAN directly, but are able to acquire data from the ECUs by the diagnostic communication. Therefore, it is often performed to connect an external product such as a third party meter to the OBD connector and extract desired data such as vehicle speed data from the ECUs by the diagnostic communication. The term "external product" means a product other than a genuine product. The term "genuine product" means a product that is made by a vehicle manufacturer or approved by the vehicle manufacturer, such as a diagnostic tool.

External products tend to perform the diagnostic communication in short cycles for a long period of time. Therefore, when an external product is connected, a particular ECU may be substantially occupied in a vehicle, and it may not be possible to properly perform operations or services that require data from the ECU. In some cases, this can cause the battery to run out.

It would be helpful to detect connection, to a vehicle, of an external device that may cause a malfunction.

A communication apparatus according to the present disclosure is a communication apparatus to be mounted on a vehicle together with a control apparatus configured to accept, from a device electrically connected to a connector on the vehicle, a communication request to request transmission of data and transmit a communication response including the data to the device, the communication apparatus including:

a communication interface configured to sequentially transmit two or more communication requests to the control apparatus, and in a case in which a communication response corresponding to at least one of transmitted communication requests is received from the control apparatus, transmit data included in the received communication response to a server apparatus installed in a location different from the vehicle; and a controller configured to determine whether a device to be detected is electrically connected to the connector depending on whether the communication interface has received a communication response corresponding to each of the two or more communication requests.

A determination method according to the present disclosure includes:

accepting, from a device electrically connected to a connector on a vehicle, a communication request to request transmission of data and transmitting a communication response including the data from a control apparatus mounted on the vehicle to the device;

sequentially transmitting two or more communication requests from a communication apparatus mounted on the vehicle to the control apparatus;

in a case in which a communication response corresponding to at least one of communication requests transmitted from the communication apparatus is received by the communication apparatus, transmitting data included in the received communication response from the communication apparatus to a server apparatus installed in a location different from the vehicle; and determining whether a device to be detected is electrically connected to the connector depending on whether the communication apparatus has received a communication response corresponding to each of the two or more communication requests.

According to the present disclosure, it is possible to detect connection, to a vehicle, of an external device that may cause a malfunction.

DETAILED DESCRIPTION

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

Figure 1:
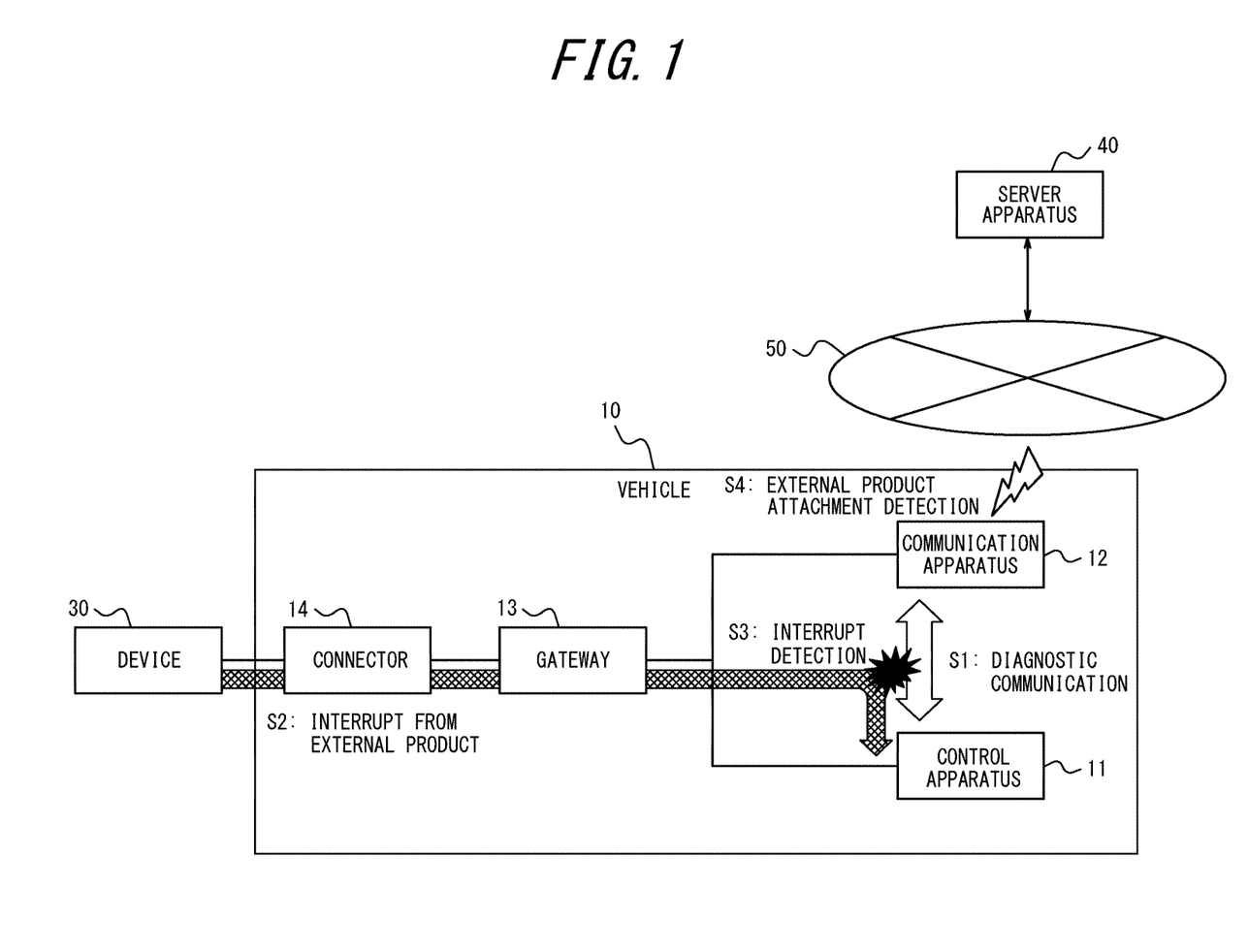
FIG. 1 is a diagram illustrating a configuration of a system according to an embodiment of the present disclosure.

A configuration of a system according to the present embodiment will be described with reference to FIG. 1.

The system according to the present embodiment includes at least one vehicle 10 and at least one server apparatus 40.

The vehicle 10 includes at least one control apparatus 11, at least one communication apparatus 12, at least one gateway 13, and at least one connector 14. The control apparatus 11 can communicate via the gateway 13 with a device 30 electrically connected to the connector 14. The communication apparatus 12 can communicate with the server apparatus 40 via a network 50.

The vehicle 10 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 10 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers.

The control apparatus 11 is specifically an ECU mounted on the vehicle 10. The communication apparatus 12 is specifically a dedicated communication device mounted on the vehicle 10. The gateway 13 is specifically a CGW mounted on the vehicle 10. The term "CGW" is an abbreviation of central gateway. The connector 14 is specifically an OBD connector. The OBD connector is also referred to as a DLC. The term "DLC" is an abbreviation of Diagnostic Link Connector. The connector 14 is located, for example, at the foot of the driver's seat.

The device 30 may be any external device as long as the device 30 can be electrically connected to the connector 14.

The server apparatus 40 is, for example, a server computer that belongs to a cloud computing system. The server apparatus 40 is installed in a location different from the vehicle 10, such as a data center.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The control apparatus 11 accepts, from the device 30 electrically connected to the connector 14, a communication request to request transmission of data and transmits a communication response including the data to the device 30. The communication apparatus 12 sequentially transmits two or more communication requests to the control apparatus 11. In a case in which a communication response corresponding to at least one of transmitted communication requests is received from the control apparatus 11, the communication apparatus 12 transmits data included in the received communication response to the server apparatus 40. The communication apparatus 12 determines whether a device to be detected is electrically connected to the connector 14 depending on whether the communication apparatus 12 has received a communication response corresponding to each of the two or more communication requests transmitted by the communication apparatus 12.

Suppose that the device 30 electrically connected to the connector 14 has been transmitting communication requests to the control apparatus 11 in short cycles for a long period of time. In this case, the control apparatus 11 is substantially occupied in the vehicle 10, and operations or services that require data from the control apparatus 11 cannot be performed properly. In some cases, this may cause the battery to run out. However, in the present embodiment, in such a case, communication responses corresponding to the two or more communication requests transmitted by the communication apparatus 12 cease to be transmitted from the control apparatus 11, and thus it is possible to determine that an external device that may cause a malfunction is electrically connected to the connector 14. Therefore, according to the present embodiment, it is possible to detect connection, to the vehicle 10, of an external device that may cause a malfunction.

Figure 2:
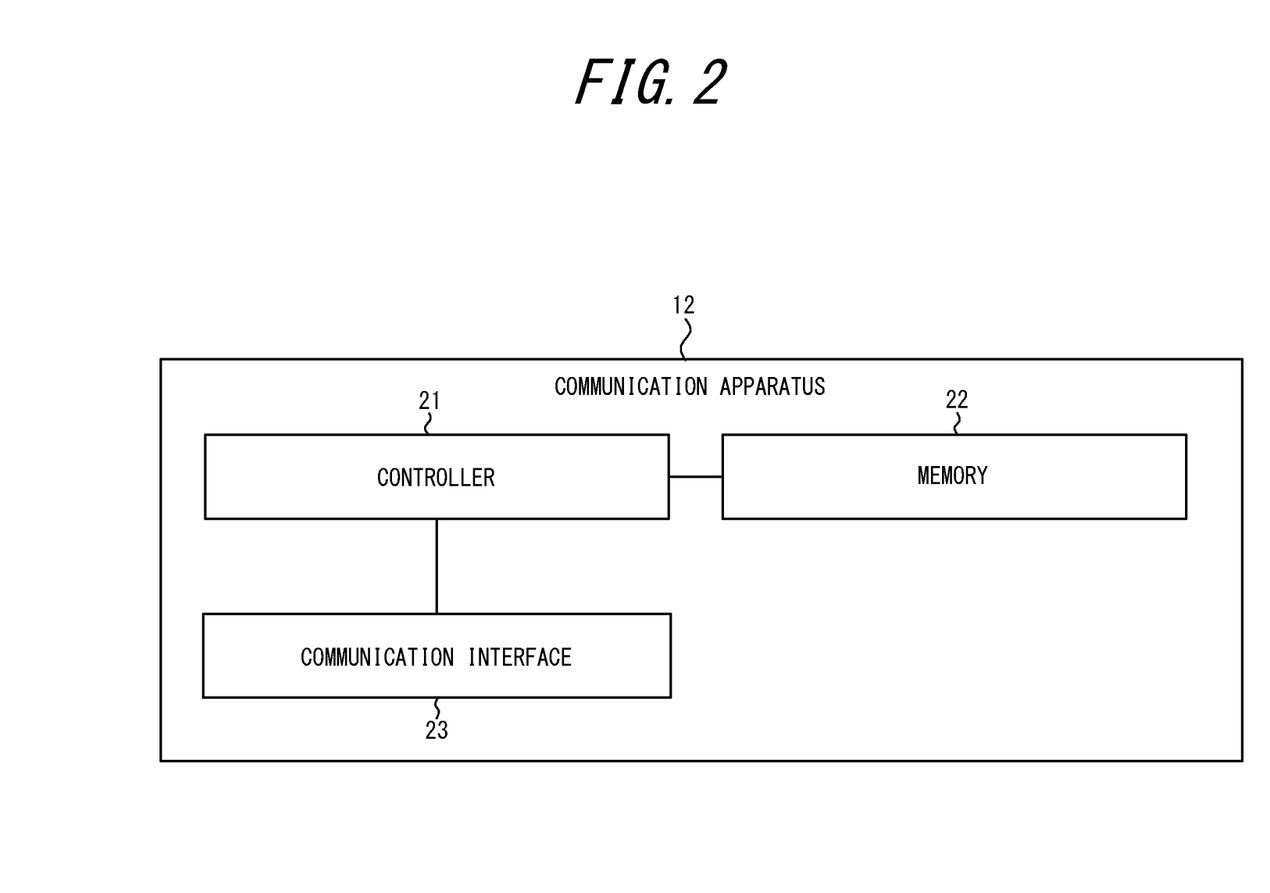
FIG. 2 is a block diagram illustrating a configuration of a communication apparatus according to the embodiment of the present disclosure.

A configuration of the communication apparatus 12 according to the present embodiment will be described with reference to FIG. 2.

The communication apparatus 12 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the communication apparatus 12 while controlling components of the communication apparatus 12.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the communication apparatus 12 and data obtained by the operations of the communication apparatus 12.

The communication interface 23 includes at least two interfaces for communication. One of the interfaces for communication is, for example, an interface compliant with an in-vehicle communication standard such as CAN, and is used for communication with the control apparatus 11. Another one of the interfaces for communication is, for example, an interface compliant with a mobile communication standard such as LTE, the 4G standard, or the 5G standard, and is used for communication with the server apparatus 40. The communication interface 23 receives data to be used for the operations of the communication apparatus 12, and transmits data obtained by the operations of the communication apparatus 12.

The functions of the communication apparatus 12 are realized by execution of a program according to the present embodiment by a processor serving as the controller 21. That is, the functions of the communication apparatus 12 are realized by software. The program causes a computer to execute the operations of the communication apparatus 12, thereby causing the computer to function as the communication apparatus 12. That is, the computer executes the operations of the communication apparatus 12 in accordance with the program to thereby function as the communication apparatus 12.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the communication apparatus 12 may be realized by a programmable circuit or a dedicated circuit serving as the controller 21. That is, some or all of the functions of the communication apparatus 12 may be realized by hardware.

Figure 3:
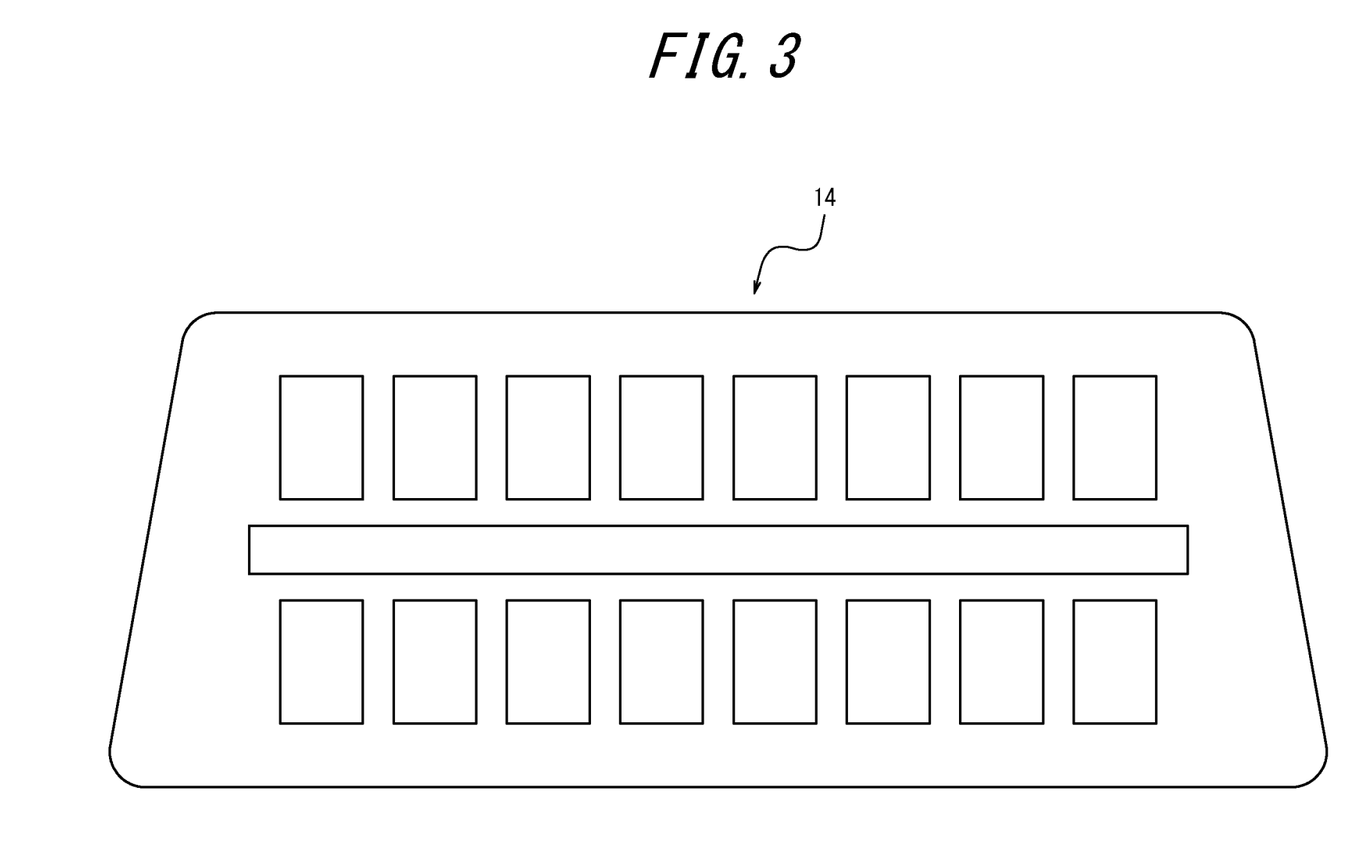
FIG. 3 is a diagram illustrating a configuration of a connector according to the embodiment of the present disclosure.

A configuration of the connector 14 according to the present embodiment will be described with reference to FIG. 3.

The connector 14 is configured as a 16-pin connector, just like a normal OBD connector. Unnecessary pins among the 16 pins may be omitted.

Figure 4:
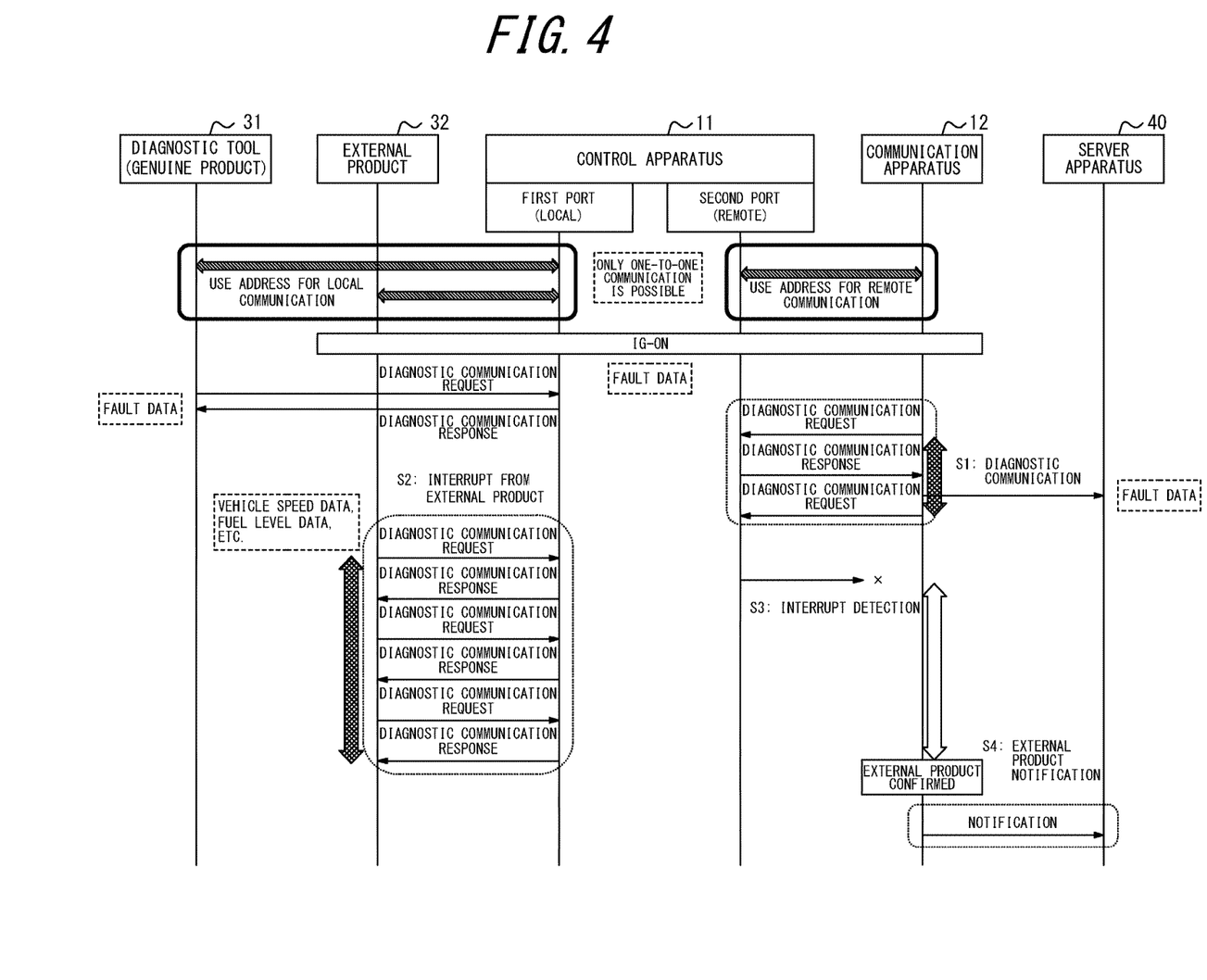
FIG. 4 is a sequence diagram illustrating operations of the system according to the embodiment of the present disclosure.

Operations of the system according to the present embodiment will be described with reference to FIG. 4. These operations correspond to a determination method according to the present embodiment.

As the device 30, a diagnostic tool 31, which is a genuine product, may be electrically connected to the connector 14, or an external product 32, such as a third party meter, may be electrically connected to the connector 14. In either case, the control apparatus 11 accepts, from the device 30, a communication request to request transmission of data and transmits a communication response including the data to the device 30. That is, the control apparatus 11 performs diagnostic communication with the device 30.

In the present embodiment, upon accepting one communication request, the control apparatus 11 does not accept the next communication request until a corresponding communication response is transmitted. That is, the control apparatus 11 can perform diagnostic communication only in a one-to-one manner.

The communication interface 23 of the communication apparatus 12 sequentially transmits two or more communication requests to the control apparatus 11. The control apparatus 11 accepts communication requests from the communication apparatus 12 and transmits corresponding communication responses to the communication apparatus 12, unless the communication requests are transmitted from the communication apparatus 12 between the acceptance of the communication request from the device 30 and the transmission of the corresponding communication response to the device 30. That is, the control apparatus 11 performs diagnostic communication with the communication apparatus 12, unless while performing diagnostic communication with the device 30. The diagnostic communication performed with the communication apparatus 12 is pseudo-diagnostic communication that is different from the normal diagnostic communication performed with the device 30 via the connector 14. In a case in which a communication response corresponding to at least one of the transmitted communication requests is received from the control apparatus 11, the communication interface 23 of the communication apparatus 12 transmits data included in the received communication response to the server apparatus 40.

The controller 21 of the communication apparatus 12 determines whether a device to be detected is electrically connected to the connector 14 depending on whether the communication interface 23 has received a communication response corresponding to each of the two or more communication requests. That is, the controller 21 determines whether a device to be detected is electrically connected to the connector 14 depending on whether the diagnostic communication that has been repeatedly performed by the communication interface 23 is successful.

Specific examples of the operations will be described below.

When the diagnostic tool 31 is electrically connected to the connector 14, the diagnostic tool 31 transmits, to the control apparatus 11, a communication request to request transmission of fault data, which is data for fault diagnosis. The control apparatus 11 receives the communication request via a first port for local communication. The control apparatus 11 performs CAN communication in response to the received communication request and acquires fault data. Alternatively, when the ignition of the vehicle 10 is on, the control apparatus 11 performs CAN communication at any time and stores obtained fault data in a memory. Then, the control apparatus 11 acquires the fault data from the memory in response to the received communication request. The control apparatus 11 transmits a communication response including the acquired fault data to the diagnostic tool 31 via the first port. The diagnostic tool 31 receives the communication response via the connector 14. The diagnostic tool 31 performs fault diagnosis using the fault data included in the received communication response. Alternatively, the diagnostic tool 31 presents the fault data included in the received communication response to a user of the diagnostic tool 31 to assist in fault diagnosis.

In step S1, the controller 21 of the communication apparatus 12 controls the communication interface 23 to sequentially transmit two or more communication requests while measuring time. The communication interface 23 of the communication apparatus 12 transmits, to the control apparatus 11, a single communication request at fixed intervals, such as every 30 minutes, to request transmission of fault data. Each time a communication request is transmitted from the communication apparatus 12, the control apparatus 11 receives the communication request via a second port for remote communication. The control apparatus 11 performs CAN communication in response to the received communication request and acquires fault data. Alternatively, when the ignition of the vehicle 10 is on, the control apparatus 11 performs CAN communication at any time and stores obtained fault data in a memory. Then, the control apparatus 11 acquires the fault data from the memory in response to the received communication request. The control apparatus 11 transmits a communication response including the acquired fault data to the communication apparatus 12 via the second port. The communication interface 23 of the communication apparatus 12 receives the communication response by CAN communication. The communication interface 23 transmits the fault data included in the received communication response to the server apparatus 40. The server apparatus 40 receives the fault data. The server apparatus 40 performs fault diagnosis using the received fault data. Alternatively, the server apparatus 40 notifies a user or a dealer of the vehicle 10 of the received fault data to assist in fault diagnosis.

In step S2, when the external product 32 is electrically connected to the connector 14, the external product 32 transmits, to the control apparatus 11, a communication request to request transmission of vehicle data such as vehicle speed data or fuel level data. The control apparatus 11 receives the communication request via the first port. The control apparatus 11 performs CAN communication in response to the received communication request and acquires vehicle data. Alternatively, when the ignition of the vehicle 10 is on, the control apparatus 11 performs CAN communication at any time and stores obtained vehicle data in a memory. Then, the control apparatus 11 acquires the vehicle data from the memory in response to the received communication request. The control apparatus 11 transmits a communication response including the acquired vehicle data to the external product 32 via the first port. The external product 32 receives the communication response via the connector 14. The external product 32 performs desired processing using the vehicle data included in the received communication response. Alternatively, the external product 32 presents the vehicle data included in the received communication response to a user of the external product 32.

In step S3, the controller 21 of the communication apparatus 12 determines that a device to be detected is electrically connected to the connector 14, in a case in which the count of communication responses received by the communication interface 23 before the measured time reaches a threshold T1 is less than a criterion value C1. The criterion value C1 is 1 in the present embodiment, but may be a value equal to or greater than 2. The threshold T1 is a fixed value in the present embodiment, for example, two hours, but may be a variable value. In the present embodiment, the controller 21 resets a timer for time measurement, in a case in which a communication response is received by the communication interface 23 between controlling the communication interface 23 to transmit one communication request in step S1 and controlling the communication interface 23 to transmit the next communication request. Then, the controller 21 starts the timer when controlling the communication interface 23 to transmit the next communication request. For example, the controller 21 controls the communication interface 23 to transmit a single communication request every 30 minutes, after the timer is started. When two hours have elapsed and no communication response has been received from the control apparatus 11 in response to any of at least four communication requests transmitted by the communication interface 23 until that time, the controller 21 determines that an external device that may cause a malfunction is electrically connected to the connector 14.

In step S4, in a case in which a device to be detected is determined to be electrically connected to the connector 14, the controller 21 of the communication apparatus 12 controls the communication interface 23 to transmit notification data. The notification data is data notifying that a device to be detected is electrically connected to the connector 14. Specifically, the notification data is data notifying that a device other than the diagnostic tool 31 is electrically connected to the connector 14. The communication interface 23 transmits the notification data to the server apparatus 40. The server apparatus 40 receives the notification data. The server apparatus 40 notifies the user or the dealer of the vehicle 10 of the received notification data to alert them.

As described above, in the present embodiment, the control apparatus 11 accepts, from the device 30 electrically connected to the connector 14, a communication request to request transmission of data and transmits a communication response including the data to the device 30. The communication interface 23 of the communication apparatus 12 sequentially transmits two or more communication requests to the control apparatus 11. In a case in which a communication response corresponding to at least one of transmitted communication requests is received from the control apparatus 11, the communication interface 23 transmits data included in the received communication response to the server apparatus 40. The controller 21 of the communication apparatus 12 determines whether a device to be detected is electrically connected to the connector 14 depending on whether the communication interface 23 has received a communication response corresponding to each of the two or more communication requests. Therefore, according to the present embodiment, it is possible to detect connection, to the vehicle 10, of an external device that may cause a malfunction.

In the present embodiment, the communication apparatus 12 carries out diagnostic communication at regular intervals with an ECU capable of communicating with an external device via an OBD connector. The communication apparatus 12 determines that the external product 32 is connected, in a case in which it is determined that the diagnostic communication cannot be carried out for a certain period of time. Therefore, according to the present embodiment, the presence of the external product 32 can be detected.

When data is requested by diagnostic communication, the ECU cannot recognize from where the data is requested and can only return the requested data. The communication apparatus 12 carries out diagnostic communication that is different from normal diagnostic communication. The communication apparatus 12 is denied communication while the ECU is carrying out the normal diagnostic communication. Since the normal diagnostic communication is not carried out for several consecutive hours, the denial of communication hardly occurs unless the external product 32 is connected. Therefore, the communication apparatus 12 can detect the presence of the external product 32 by detecting the denial of communication over a certain period of time or more such as two hours. As a result, it is possible to prevent the occurrence of a malfunction such as an inability to correctly provide a service, such as an emergency call, that requires data from the ECU, or the battery running out.

In the present embodiment, the controller 21 of the communication apparatus 12 determines that a device to be detected is electrically connected to the connector 14, in a case in which the count of communication responses received by the communication interface 23 before the measured time reaches the threshold T1 is less than the criterion value C1, but the determination criteria are not limited to this. As a variation of the present embodiment, the controller 21 may determine that a device to be detected is electrically connected to the connector 14, in a case in which the count of communication responses received by the communication interface 23 before the transmission count for communication requests from the communication interface 23 reaches a threshold T2 is less than a criterion value C2. In this variation, the controller 21 does not have to measure time, when controlling the communication interface 23 to sequentially transmit two or more communication requests. The criterion value C2 is 1 in this variation, but may be a value equal to or greater than 2. The threshold T2 is a fixed value in this variation, for example, five times, but may be a variable value. In this variation, the controller 21 resets the transmission count, in a case in which a communication response is received by the communication interface 23 between controlling the communication interface 23 to transmit one communication request in step S1 and controlling the communication interface 23 to transmit the next communication request. Then, the controller 21 starts counting when controlling the communication interface 23 to transmit the next communication request. For example, the controller 21 controls the communication interface 23 to transmit a single communication request every 30 minutes, after the counting is started. When two hours have elapsed and no communication response has been received from the control apparatus 11 in response to any of at least four communication requests transmitted by the communication interface 23 until that time, the controller 21 determines that an external device that may cause a malfunction is electrically connected to the connector 14.

The present disclosure is not limited to the embodiment described above. For example, two or more blocks described in the block diagrams may be integrated, or a block may be divided. Instead of executing two or more steps described in the sequence diagram in chronological order in accordance with the description, the steps may be executed in parallel or in a different order according to the processing capability of the apparatus that executes each step, or as required. Other modifications can be made without departing from the spirit of the present disclosure.

The invention claimed is:

1. A communication apparatus to be mounted on a vehicle together with a control apparatus configured to accept, from a device electrically connected to a connector on the vehicle, a communication request to request transmission of data and transmit a communication response including the data to the device, the communication apparatus comprising:
    a communication interface configured to sequentially transmit two or more communication requests to the control apparatus, and in a case in which a communication response corresponding to at least one of transmitted communication requests is received from the control apparatus, transmit data included in the received communication response to a server apparatus installed in a location different from the vehicle; and
    a controller configured to determine whether a device to be detected is electrically connected to the connector depending on whether the communication interface has received a communication response corresponding to each of the two or more communication requests.

2. The communication apparatus according to claim 1, wherein in a case in which a device to be detected is determined by the controller to be electrically connected to the connector, the communication interface transmits, to the server apparatus, notification data notifying that a device to be detected is electrically connected to the connector.

3. The communication apparatus according to claim 2, wherein the notification data is data notifying that a device other than a diagnostic tool is electrically connected to the connector, the diagnostic tool being a device configured to transmit, to the control apparatus, a communication request to request transmission of data for fault diagnosis.

4. The communication apparatus according to claim 1, wherein the controller is configured to control the communication interface to sequentially transmit the two or more communication requests while measuring time, and determine that a device to be detected is electrically connected to the connector, in a case in which a count of communication responses received by the communication interface before the measured time reaches a threshold is less than a criterion value.

5. The communication apparatus according to claim 4, wherein the criterion value is 1.

6. The communication apparatus according to claim 4, wherein the threshold is a fixed value.

7. The communication apparatus according to claim 1, wherein the controller is configured to control the communication interface to sequentially transmit the two or more communication requests, and determine that a device to be detected is electrically connected to the connector, in a case in which a count of communication responses received by the communication interface before a transmission count reaches a threshold is less than a criterion value.

8. The communication apparatus according to claim 7, wherein the criterion value is 1.

9. The communication apparatus according to claim 7, wherein the threshold is a fixed value.

10. The communication apparatus according to claim 1, wherein the communication interface is configured to transmit a single communication request at fixed intervals when transmitting the two or more communication requests.

11. A vehicle comprising:
    the communication apparatus according to claim 1;
    the control apparatus; and
    the connector.

12. The vehicle according to claim 11, wherein upon accepting one communication request, the control apparatus does not accept a next communication request until a corresponding communication response is transmitted.

13. A system comprising:
    the vehicle according to claim 11; and
    the server apparatus.

14. A determination method comprising:
    accepting, from a device electrically connected to a connector on a vehicle, a communication request to request transmission of data and transmitting a communication response including the data from a control apparatus mounted on the vehicle to the device;
    sequentially transmitting two or more communication requests from a communication apparatus mounted on the vehicle to the control apparatus;
    in a case in which a communication response corresponding to at least one of communication requests transmitted from the communication apparatus is received by the communication apparatus, transmitting data included in the received communication response from the communication apparatus to a server apparatus installed in a location different from the vehicle; and determining whether a device to be detected is electrically connected to the connector depending on whether the communication apparatus has received a communication response corresponding to each of the two or more communication requests.

15. The determination method according to claim 14, further comprising, in a case in which a device to be detected is determined to be electrically connected to the connector, transmitting, from the communication apparatus to the server apparatus, notification data notifying that a device to be detected is electrically connected to the connector.

16. The determination method according to claim 15, wherein the notification data is data notifying that a device other than a diagnostic tool is electrically connected to the connector, the diagnostic tool being a device configured to transmit, to the control apparatus, a communication request to request transmission of data for fault diagnosis.

17. The determination method according to claim 14, further comprising measuring time when the two or more communication requests are sequentially transmitted, wherein the determining includes determining that a device to be detected is electrically connected to the connector, in a case in which a count of communication responses received by the communication apparatus before the measured time reaches a threshold is less than a criterion value.

18. The determination method according to claim 14, wherein the determining includes determining that a device to be detected is electrically connected to the connector, in a case in which a count of communication responses received by the communication apparatus before a transmission count for communication requests from the communication apparatus reaches a threshold is less than a criterion value.

19. The determination method according to claim 14, wherein the transmitting of the two or more communication requests includes transmitting a single communication request at fixed intervals.

20. The determination method according to claim 14, wherein upon accepting one communication request, the control apparatus does not accept a next communication request until a corresponding communication response is transmitted.

* * * * *